(12) United States Patent
Kikuchi et al.

(10) Patent No.: US 6,742,902 B2
(45) Date of Patent: Jun. 1, 2004

(54) COMPOSITE MATERIAL

(75) Inventors: Hideyuki Kikuchi, Shizuoka (JP); Toru Komatsu, Shimada (JP); Masaki Kobayashi, Fujieda (JP)

(73) Assignee: Murakami Corporation, Shizuoka (JP)

( * ) Notice: Subject to any disclaimer, the term of this patent is extended or adjusted under 35 U.S.C. 154(b) by 115 days.

(21) Appl. No.: 09/979,285

(22) PCT Filed: May 17, 2001

(86) PCT No.: PCT/JP01/04104
§ 371 (c)(1),
(2), (4) Date: Feb. 20, 2002

(87) PCT Pub. No.: WO01/87593
PCT Pub. Date: Nov. 22, 2001

(65) Prior Publication Data
US 2003/0016433 A1 Jan. 23, 2003

(30) Foreign Application Priority Data
May 17, 2000  (JP) ........................................ 2000-145395

(51) Int. Cl.$^7$ ................................................. G02B 5/08
(52) U.S. Cl. ....................................... 359/512; 359/507
(58) Field of Search ................................. 359/507, 584, 359/585, 513, 514, 883, 884, 603

(56) References Cited

U.S. PATENT DOCUMENTS 5,854,708 A    12/1998    Kamotsu et al.

FOREIGN PATENT DOCUMENTS

| EP | 0 820 967 | 1/1998 |
|----|-----------|--------|
| JP | 10-036144 | 2/1998 |
| JP | 10-297436 | 10/1998 |
| JP | 10-329261 | 12/1998 |
| JP | 11-092146 | 4/1999 |
| JP | 2000-131513 | 5/2000 |

*Primary Examiner*—Euncha Cherry
(74) *Attorney, Agent, or Firm*—Knobbe, Martens, Olson & Bear LLP

(57) ABSTRACT

On the surface of a light-transmitting plate material 22, a transparent metal thin film 24 is provided, and further, on the surface of the transparent metal thin film 24, a hydrophilic functional layer 26 containing a photocatalytic substance is provided. The hydrophilic functional layer 26 comprises a laminate of, from the side of the transparent metal thin film 24, a photocatalytic layer 28 containing a photocatalytic substance and a hydrophilic layer 30 containing a hydrophilic substance.

31 Claims, 12 Drawing Sheets

Prior Art

Prior Art

Prior Art

COMPOSITE MATERIAL

This application is the U.S. National Phase under 35 U.S.C. §371 of International Application PCT/JP01/04104, filed May 17, 2001, which claims priority to Japanese Patent Application No. 2000-145395, filed May 17, 2000, the disclosure of which is herein incorporated by reference in its entirety. The International Application was not published under PCT Article 21(2) in English.

TECHNICAL FIELD

The present invention relates to a composite material the surface of which is made to be hydrophilic or antifouling by forming a film layer containing a photocatalytic substance on a material surface of a substrate, a lens, a glass plate, a mirror, etc, improving the hydrophilicity or antifouling property of the material surface.

BACKGROUND ART

A technique, which keeps a surface of a material clean by forming a photocatalytic substance layer on a material surface, has been known. This technique enables removing dirt easily by decomposing dirt adhering to the material surface using a photocatalytic action of a photocatalytic substance layer provided on the material surface and by rinsing the material surface with water or the like.

As a composite material employing a material surface cleaning technique using such a photocatalytic substance layer, there was one which was proposed by Japanese Patent Laid-open No.H10-36144 applied for by this applicant. Its structure is described, referring to cross-sectional drawing FIG. 2. In this, a surface is made hydrophilic by providing a $SiO_2$ film 6 porously on the surface of a base material 2. A surface of a $SiO_2$ film 6 is originally hydrophilic, the hydrophilicity, however, is improved by making the surface porous. With a $SiO_2$ film 6 exclusively provided, hydrophilicity decreases with dirt adhering to the surface if it is exposed to the air for a long period of time. Accordingly, by providing a $TiO_2$ film 4 between a $SiO_2$ film 6 and a base material 2, the photocatalytic decomposition action of the $TiO_2$ 4 film is used to decompose dirt adhering to the surface of a $SiO_2$ film 6 and to keep the surface of a $SiO_2$ film 6 clean, maintaining the hydrophilicity.

FIG. 3 shows a graph indicating spectral reflectance characteristics in a visible region (380~780 nm) in a conventional structure shown in FIG. 2 with a $SiO_2$ film thickness made at 10 nm and when a film thickness of a $TiO_2$ film 4 changes to 50, 100, 150, and 200 nm. FIG. 4 shows a graph indicating spectral reflectance characteristics with like samples. As shown in FIG. 3 and FIG. 4, when a film thickness of a $TiO_2$ film 4 is 50 nm, relatively flat reflectance characteristics and transmittance characteristics were obtained, while the amplitude in reflectance increases with a film thickness of 100, 150, and 200 nm as wavelengths change.

Additionally, Table 1 shows initial contact angles and contact angles after being exposed to black light with an intensity of 1 $mW/cm^2$ for four hours when oil is applied onto each material surface of a $TiO_2$ film 4, using samples prepared in a conventional structure shown in FIG. 2 with a film thickness of 50, 100 or 150 nm similar to FIG. 3 and FIG. 4 respectively.

TABLE 1

| $TiO_2$ Film Thickness (in nm) | Initial Contact Angle (in degree) | Contact Angle after being exposed to black light (in degree) |
|---|---|---|
| 50 | 87.7 | 72.1 |
| 100 | 86.6 | 8.3 |
| 150 | 85.6 | 7.9 |

DISCLOSURE OF INVENTION

As can be seen from the results of Table 1, for a hydrophilic material using the above-stated photocatalytic substance, a photocatalytic substance film 4 with a film thickness of 100 nm or more is required to obtain a photocatalytic decomposition action to maintain hydrophilicity. As shown in FIG. 3, however, when a film thickness of a $TiO_2$ film 4 is 100, 150 or 200 nm, a coloring action takes place on a material surface due to increased amplitude occurring in spectral characteristics. This is because optical interference in a visible light region occurs at a $TiO_2$ film 4 due to formation of a thick $TiO_2$ film 4. Thus, if the amplitude in spectral characteristics is large, the color tone of an original material surface is spoiled. Additionally, to provide a thick film thickness, more photocatalytic substance material is required.

The present invention has been realized in consideration of the above-mentioned points, to provide a composite material which can obtain sufficient antifouling properties or hydrophilicity even when a photocatalytic substance film is thinner than a conventional film. Thus an optical interference action in a photocatalytic substance is suppressed and an amount of a photocatalytic substance to be used is decreased.

The present invention possesses a base material, a transparent metal thin film provided on the surface of the base material, and a hydrophilic functional layer containing a photocatalytic substance provided on a surface of the transparent metal thin film. According to experiments conducted by inventors, it was found that, by providing a transparent metal thin film, a photocatalytic property improves. Due to this, because hydrophilicity or antifouling can be obtained even if a hydrophilic functional layer containing a photocatalytic substance is thinner than conventional layers, an amount of a photocatalytic substance to be used can be reduced. Additionally, by making a hydrophilic functional layer containing a photocatalytic substance thinner, optical interference in a hydrophilic functional layer containing the photocatalytic substance can be reduced and the color tone of a base material can be maintained.

Figure 1:
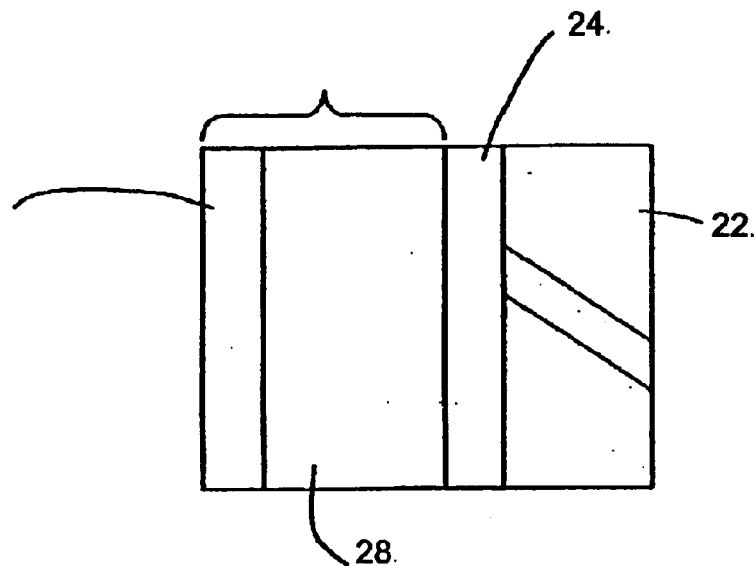
FIG. 1 is a cross-sectional view showing Embodiment 1 for carrying out the present invention.

22: Light-transmitting plate material, 24: Transparent metal thin film, 26: Hydrophilic functional layer containing a photocatalytic substance, 28: Photocatalytic layer containing a photo catalytic substance, 30: Hydrophilic layer containing a hydrophilic substance, 34: Mixed layer containing a photocatalytic substance and a hydrophilic substance, 40: Reflection film, 42: Transparent electrode film, 44: Solid-phase electrochromic layer, 46: Electrode-reflection dual function film, 52: Liquid-phase electrochromic layer, 54: First transparent electrode film, 56: Second transparent electrode film.

BEST MODE FOR CARRYING OUT THE INVENTION

The present invention is summarized above. Additionally, in the present invention, the above-mentioned base material can comprise a light-transmitting material.

Additionally, in the present invention, the above-mentioned base material can comprise a plate material.

Additionally, in the present invention, the above-mentioned base material can comprise a light-transmitting plate material. Accordingly, because sufficient photocatalytic performance can be obtained even if a hydrophilic functional layer containing a photocatalytic substance is made thin, optical interference in a hydrophilic functional layer containing the photocatalytic substance can be reduced and the original optical transparency of the light-transmitting plate material can be maintained.

Additionally, the present invention can be constructed as a defogging mirror by providing a reflection film on the back of the above-mentioned light-transmitting plate material (which is a surface on which the above-mentioned transparent metal thin film is not provided). Accordingly, because sufficient photocatalytic performance can be obtained even if a hydrophilic functional layer containing a photocatalytic substance is made thin, optical interference in a hydrophilic functional layer containing the photocatalytic substance can be reduced and the color tone of a reflected image by a reflection film can be maintained.

The above-mentioned light-transmitting plate material comprises a light-transmitting colored plate material having light wavelength selectivity. Accordingly, because sufficient photocatalytic performance can be obtained even if a hydrophilic functional layer containing a photocatalytic substance is made thin, optical interference in a hydrophilic functional layer containing the photocatalytic substance can be reduced and an transparent plate defogging material which maintains the original color tone of the light-transmitting colored plate material can be provided.

By providing a reflection film on the back of the above-mentioned light-transmitting plate material, a defogging mirror can be constructed. Accordingly, because sufficient photocatalytic performance can be obtained even if a hydrophilic functional layer containing a photocatalytic substance is made thin, optical interference in a hydrophilic functional layer containing the photocatalytic substance can be reduced and a defogging mirror which maintains the original color tone of the light-transmitting colored plate material can be provided.

Additionally, in the present invention, the above-mentioned light-transmitting plate material can be constructed by providing a liquid-phase electrochromic layer between two light-transmitting substrates and transparent electrode films on a respective surface opposite to the above-mentioned two light-transmitting substrates. Accordingly, because sufficient photocatalytic performance can be obtained even if a hydrophilic functional layer containing a photocatalytic substance is made thin, optical interference in a hydrophilic functional layer containing the photocatalytic substance can be reduced, and a defogging material, which does not interfere with a color antiglare action of the liquid-phase electrochromic layer, can be provided.

By providing a reflection film on the back of the above-mentioned light-transmitting plate material, a defogging mirror can be constructed. Accordingly, because sufficient photocatalytic performance can be obtained even if a hydrophilic functional layer containing a photocatalytic substance is made thin, optical interference in a hydrophilic functional layer containing the photocatalytic substance can be reduced, and a defogging mirror, which does not interfere with a color antiglare action of the liquid phase electrochromic layer, can be provided.

Additionally, in the present invention, the above-mentioned light-transmitting plate material can be constructed by forming in laminated layers the first transparent electrode film, a solid-phase electrochromic layer and the second transparent electrode film in consecutive order on the back of the light-transmitting substrate. Accordingly, because sufficient photocatalytic performance can be obtained even if a hydrophilic functional layer containing a photocatalytic substance is made thin, optical interference in a hydrophilic functional layer containing the photocatalytic substance can be reduced, and a defogging material, which does not interfere with a color antiglare action of the solid-phase electrochromic layer, can be provided.

Additionally, in the present invention, the above-mentioned plate material can be constructed by forming in laminated layers a transparent electrode film, a solid-phase electrochromic layer and an electrode-reflection dual function film in consecutive order on the back of the light-transmitting substrate. Accordingly, because sufficient photocatalytic performance can be obtained even if a hydrophilic functional layer containing a photocatalytic substance is made thin, optical interference in a hydrophilic functional layer containing the photocatalytic substance can be reduced, and a defogging mirror, which does not interfere with a color antiglare action of the solid-phase electrochromic layer, can be provided. Additionally, because the above-mentioned electrode-reflection dual function film serve both as an electrode film and a reflection film, it is not necessary to provide both films and manufacturing and material costs can be reduced.

Alternatively, in the present invention, a plate material is formed as a defogging mirror, in which a light-transmitting substrate with a transparent electrode film provided on one side and a substrate with an electrode-reflection dual function film provided on the other side are placed so that the transparent electrode film and the electrode-reflection dual function film face each other, and a liquid-phase electrochromic layer is provided between the light-transmitting substrate and the substrate. Accordingly, because sufficient photocatalytic performance can be obtained even if a hydrophilic functional layer containing a photocatalytic substance is made thin, optical interference in a hydrophilic functional layer containing the photocatalytic substance can be reduced, and a defogging mirror, which does not interfere with a color antiglare action of the solid-phase electrochromic layer, can be provided. Additionally, because the above-mentioned electrode-reflection dual function film serve both as an electrode film and a reflection film, it is not necessary to provide both films and manufacturing and material costs can be reduced.

Additionally, a defogging mirror using a composite material according to the present invention can be structured as an outer mirror for automobile use.

A hydrophilic functional layer containing the above-mentioned photocatalytic substance can comprise, from the side of the above-mentioned base material, a laminate of a photocatalytic layer containing a photocatalytic substance and a hydrophilic layer containing a hydrophilic substance as its main element.

A layer thickness of a hydrophilic layer the above-mentioned hydrophilic substance can be 50 nm or less.

A hydrophilic functional layer containing the above-mentioned photocatalytic substance can comprise a mixed layer containing a photocatalytic substance and a hydrophilic substance as its main element.

The main component of the above-mentioned photocatalytic substance can be $TiO_2$ and the main component of the above-mentioned hydrophilic substance can be $SiO_2$.

A hydrophilic functional layer containing the above-mentioned photocatalytic substance can comprise a layer the main component of which is a photocatalytic substance.

The main component of the above-mentioned photocatalytic substance can be $TiO_2$.

The surface of a hydrophilic functional layer containing the above-mentioned photocatalytic substance can be constructed porously. Accordingly, because the surface is porous, hydrophilicity can be further improved.

The above-mentioned transparent metal thin film can comprise, for example, Cr, Rh, Ag, Pt, Al or a mixture of these as its main component.

In the present invention, a transparent metal thin film is a metal thin film which is transparent in a visible light region, and it can be formed, for example, by making a metallic substance thin, scattering minute metallic particles in an island shape or disposing them in a lattice shape by patterning or the like. Furthermore, this transparent metal thin film is not necessarily colorless. Additionally, a film thickness, transmittance and color of this transparent metal thin film can be made diversely within the bounds where transparency can be obtained and effects to improve photocatalytic performance of a photocatalytic substance can be obtained. Additionally, although this transparent metal thin film may exhibit reflection depending on a film thickness or the like, a composite material according to the present invention does not include those materials which are constructed for use as a mirror using this transparent metal thin film as a reflection film.

Various embodiments for carrying out the present invention are described in the following:

Embodiment 1

FIG. 1 shows a cross-sectional drawing of Embodiment 1 for carrying out a defogging material according to the present invention. On the surface of a light-transmitting plate material 22 comprising a resin, glass, or the like, a transparent metal thin film 24 comprising Cr, Rh, or the like is formed using a vacuum deposition method, sputtering method, or the like Furthermore, on the surface of a transparent metal thin film 24, a hydrophilic functional layer 26 containing a photocatalytic substance is provided. A hydrophilic functional layer 26 containing a photocatalytic substance is constructed by forming in laminated layers, from the side of the transparent metal thin film 24, a photocatalytic layer 28 containing a photocatalytic substance comprising $TiO_2$ or the like and a hydrophilic layer 30 containing a hydrophilic substance comprising $SiO_2$ or the like using a vacuum deposition method, sputtering method, or the like Alternatively, in the embodiment of this embodiment, to improve hydrophilicity further, the surface of a hydrophilic layer 30 containing a hydrophilic substance can be formed porously.

Table 2 shows initial contact angles and contact angles after being exposed to black light with an intensity of 1 $mW/cm^2$ for four hours when oil is applied to each material surface, using samples prepared in a structure shown in FIG. 1 with a film thickness of 0 (no film formed), 1.0, 2.0 or 5.0 nm, respectively, using Cr for a transparent metal thin film 24. At this time, a photocatalytic layer 28 containing a photocatalytic substance is formed using $TiO_2$ at a film thickness of 50 nm, a hydrophilic layer 30 containing a hydrophilic substance is formed of $SiO_2$ at a film thickness of 10 nm.

TABLE 2

| Cr Film Thickness (in nm) | Initial Contact Angle (in degrees) | Contact Angle after being exposed to black light (in degrees) |
|---|---|---|
| 0 (None) | 87.7 | 72.1 |
| 1.0 | 87.0 | 49.3 |
| 2.0 | 85.5 | 7.7 |
| 5.0 | 88.5 | 5.0 |

When the thickness of a Cr film was 0 nm (no Cr film was formed), the decrease in a contact angle from the initial state was approximately 15 degrees after being exposed to black light for four hours. However, when the thickness of a Cr film is 5.0 nm, the decrease was more than 80 degrees. It can be seen that by providing a transparent metal thin film 24, a photocatalytic property has improved, the decomposition action of oil applied to the surface has been facilitated, and the hydrophilicity of a base material surface has substantially been restored.

Table 3 shows similar contact angle measurement results by preparing samples using Rh as a transparent metal thin film 24 in the structure shown in FIG. 1 with a film thickness of 0 (no film was formed), 0.5, 1.0 and 5.0 nm, respectively. When the film thickness of an Rh film was 0 nm (no Rh film was formed), the decrease in a contact angle from the initial state was approximately 15 degrees after being exposed to black light for four hours. However, when the thickness of an Rh film was 5.0 nm, the decrease was more than 50 degrees, and it can be seen that the hydrophilicity of a base material surface substantially been restored.

TABLE 3

| Rh Film Thickness (in nm) | Initial Contact Angle (in degrees) | Contact Angle after being exposed to black light (in degrees) |
|---|---|---|
| 0 (None) | 87.7 | 72.1 |
| 0.5 | 90.0 | 58.1 |
| 1.0 | 85.2 | 43.3 |
| 5.0 | 88.0 | 30.4 |

Table 4 shows similar contact angle measurement results by preparing samples using Ag as a transparent metal thin film 24 in the structure shown in FIG. 1 with a film thickness of 0 (no film was formed), 1.0, 2.0 and 5.0 nm, respectively. When the film thickness of an Ag film was 0 nm (no Ag film was formed), the decrease in a contact angle from the initial state was approximately 15 degrees after being exposed to black light for four hours. However, when the thickness of an Ag film was 5.0 nm, the decrease was more than 50 degrees, and it can be seen that the hydrophilicity of a base material surface substantially been restored.

TABLE 4

| Ag Film Thickness (in nm) | Initial Contact Angle (in degrees) | Contact Angle after being exposed to black light (in degrees) |
|---|---|---|
| 0 (None) | 87.7 | 72.1 |
| 1.0 | 88.4 | 53.0 |
| 2.0 | 86.6 | 42.0 |
| 5.0 | 87.5 | 34.5 |

Table 5 shows similar contact angle measurement results by preparing samples using Pt as a transparent metal thin film 24 in the structure shown in FIG. 1 with a film thickness of 0 (no film was formed), 1.0, 2.0 and 5.0 nm, respectively. When the film thickness of a Pt film was 0 nm (no Pt film was formed), the decrease in a contact angle from the initial state was approximately 15 degrees after being exposed to black light for four hours. However, when the thickness of a Pt film was 5.0 nm, the decrease was more than 50 degrees, and it can be seen that the hydrophilicity of a base material surface substantially been restored.

TABLE 5

| Pt Film Thickness (in nm) | Initial Contact Angle (in degrees) | Contact Angle after being exposed to black light (in degrees) |
|---|---|---|
| 0 (None) | 87.7 | 72.1 |
| 1.0 | 85.6 | 56.2 |
| 2.0 | 87.5 | 45.1 |
| 5.0 | 88.3 | 31.5 |

Table 6 shows similar contact angle measurement results by preparing samples using Al as a transparent metal thin film 24 in the structure shown in FIG. 1 with a film thickness of 0 (no film was formed), 2.0, 5.0, and 10.0 nm, respectively. When the film thickness of an Al film was 0 nm (no Al film was formed), the decrease in a contact angle from the initial state was approximately 15 degrees after being exposed to black light for four hours. However, when the thickness of an Al film was 10.0 nm, the decrease was more than 50 degrees, and it can be seen that the hydrophilicity of a base material surface substantially been restored.

TABLE 6

| Al Film Thickness (in nm) | Initial Contact Angle (in degrees) | Contact Angle after being exposed to black light (in degrees) |
|---|---|---|
| 0 (None) | 87.7 | 72.1 |
| 2.0 | 86.2 | 58.4 |
| 5.0 | 88.0 | 44.1 |
| 10.0 | 87.4 | 36.9 |

The details of an effect of improving a photocatalytic property by a transparent metal thin film have not been made clear. From the available data, it is thought that: When a photocatalytic substance is excited by ultraviolet rays absorbed in a photocatalyst layer, electrons and corresponding holes are generated within a photocatalytic substance layer. Although some of these electrons and corresponding holes disappear by pairing up (recombination), remaining electrons and corresponding holes move to a material surface, generate $O^{2-}$ (superoxide anion) with a strong oxidizing force and OH (hydroxy radical) by reacting with air and moisture on the material surface, and cause oxidative degradation of organic matter adhering to the material surface. The transparent thin film when formed exhibits an effect of improving efficiency (electric charge separation efficiency) involved in an oxidation-reduction reaction by reducing disappearing electrons and holes which are paired (recombined). Additionally, because ultraviolet rays reflected by a transparent metal thin film re-enter a photocatalyst layer, thereby increasing photoexcitation occurrences, it is thought that the film has an effect of improving photocatalytic performance.

Additionally, light transmittance characteristics in a visible light region (380~780 nm) of embodiments shown in Table 2 to Table 6 are shown in FIG. 5 to FIG. 9. Most of the examples show nearly flat spectral characteristics, and in all of the examples, transmittance of more than 30% is shown with a film thickness of 5.0 nm, indicating that in most cases films used are colorless transparent light-transmitting films.

Embodiment 2

Figure 10:
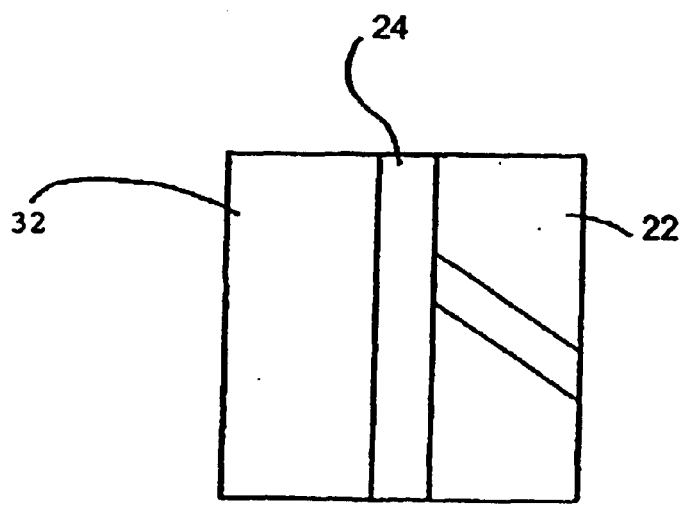
FIG. 10 is a cross-sectional view showing Embodiment 2 of the present invention.

FIG. 10 shows a cross-sectional drawing of Embodiment 2 of a composite material according to the present invention. On the surface of a light-transmitting plate material 22, a transparent metal thin film 24 comprising Cr, Rh, or the like is formed using a vacuum deposition method, for example. Furthermore on the transparent metal thin film 24, a hydrophilic layer 32 comprising a photocatalytic substance such as $TiO_2$ or the like is formed using a vacuum deposition method, sputtering method, or the like.

Because photocatalytic substances such as $TiO_2$ or the like become hydrophilic by being photoexcited, in Embodiment 2 for carrying out the invention, by forming a hydrophilic layer 32 comprising a photocatalytic substance using a photocatalytic substance such as $TiO_2$ which has a hydrophilicity, a material surface can be changed to be hydrophilic and hydrophilicity can be maintained by a photocatalytic decomposition action. Alternatively, in this embodiment for carrying out the invention, to improve hydrophilicity further, the surface of a hydrophilic layer 32 comprising a photocatalytic substance can be formed porously.

Embodiment 3

Figure 11:
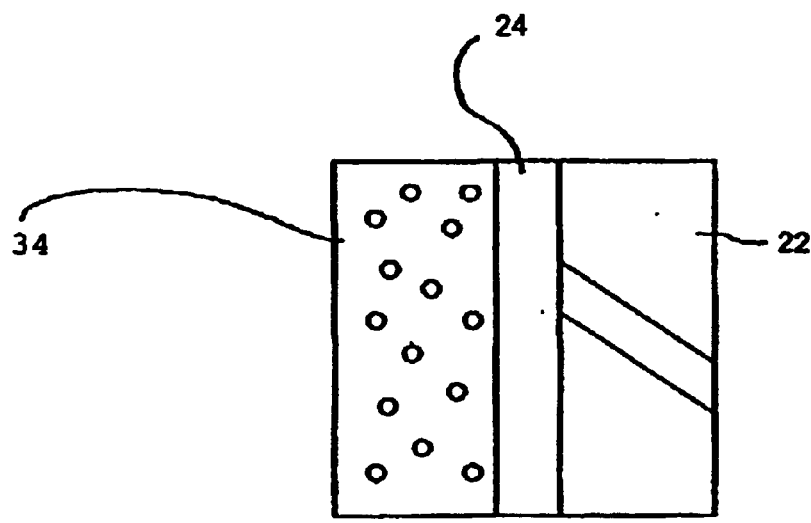
FIG. 11 is a cross-sectional view showing Embodiment 3 of the present invention.

FIG. 11 shows a cross-sectional drawing of Embodiment 3 of a composite material according to the present invention. On the surface of a light-transmitting plate material 22, a transparent metal thin film 24 comprising Cr, Rh, or the like is formed, and on the surface of the transparent metal thin film 24, a mixed layer 34 containing a photocatalytic substance comprising $TiO_2$ or the like and a hydrophilic substance comprising $SiO_2$ or the like is formed using a vacuum deposition method, for example. Alternatively, the surface of the mixed layer 34 containing a photocatalytic substance and a hydrophilic substance can be formed porously.

As in the structure shown in FIG. 11, by forming a mixed layer 34 containing a photocatalytic substance and a hydrophilic substance, a material surface can be made to become hydrophilic, and hydrophilicity can be maintained by a photocatalytic decomposition action.

Alternatively, by forming a reflection film comprising Cr, Al, or the like on the back of a light-transmitting plate material 22 of Embodiments 1 to 3 for carrying out the invention using a vacuum deposition method, sputtering method, or the like, the resulting structure can be used a defogging mirror.

Embodiment 4

Figure 12:
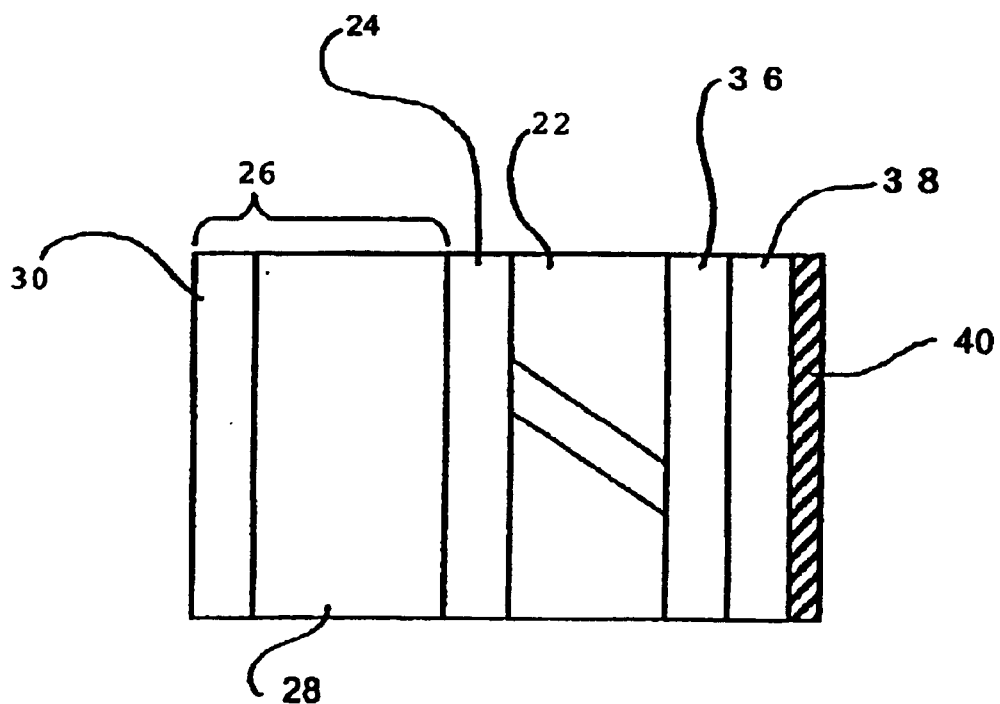
FIG. 12 is a cross-sectional view showing Embodiment 4 of the present invention.

FIG. 12 shows a cross-sectional drawing of Embodiment 4 of a defogging material according to the present invention. On a light-transmitting plate material 22, the same film structure as shown in FIG. 1 is formed. In other words, a transparent metal thin film 24 is formed and furthermore on its surface, a hydrophilic functional layer 26 containing a photocatalytic substance is provided. The hydrophilic functional layer 26 containing a photocatalytic substance comprises, from the side of the transparent metal thin film 24, a photocatalytic layer 28 containing a photocatalytic substance comprising $TiO_2$ or the like and a hydrophilic layer 30 containing a hydrophilic substance comprising $SiO_2$ or the like The above layers are formed in laminated layers by a vacuum deposition method, sputtering method, or the like. Alternatively, in this embodiment for carrying out the invention, to improve hydrophilicity further, the surface of the hydrophilic layer 30 containing a hydrophilic substance can be formed porously. On the back of the light-transmitting plate material 22, optical thin films, a $TiO_2$ film 36, a $SiO_2$ film 38 and a reflection film 40 are formed in laminated layers to be used for a defogging mirror having a selective reflectance characteristics of specific wave lengths and a colored reflection plane. Alternatively, to prevent corrosion of the reflection film 40, a protective coating (not shown) can be provided on the back of the reflection film 40.

Figure 13:
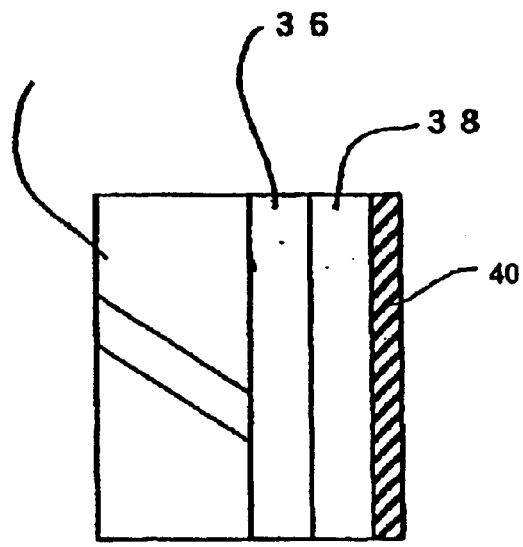
FIG. 13 is a cross-sectional view showing a conventional colored mirror.

Next, spectral reflectance characteristics of a mirror shown in FIG. 12 and conventional mirrors or the like are described. Here, a mirror shown in FIG. 12 is considered to be formed comprising a $TiO_2$ film 36 with a film thickness of 100 nm, a $SiO_2$ film 38 with a film thickness of 20 nm, a photocatalytic layer 28 containing a photocatalytic substance with a film thickness of 50 nm, and a hydrophilic layer 30 containing a hydrophilic substance with a film thickness of 10 nm. FIG. 13 shows a structure of a section of a conventional colored mirror. This structure is on the surface of a light-transmitting plate material 22 with a structure shown in FIG. 12 and does not possess a transparent metal thin film 24 or a hydrophilic functional layer 26 containing a photocatalytic substance. On the back of the light-transmitting plate material 22, a $TiO_2$ film 36, a $SiO_2$ film 38 and a reflection film 40 in the same structure and film thicknesses as these shown in FIG. 12 are formed in laminated layers. Here, the film thickness of the $TiO_2$ film 36 is made at 100 nm and the film thickness of the $SiO_2$ film 38 is made at 20 nm.

Figure 2:
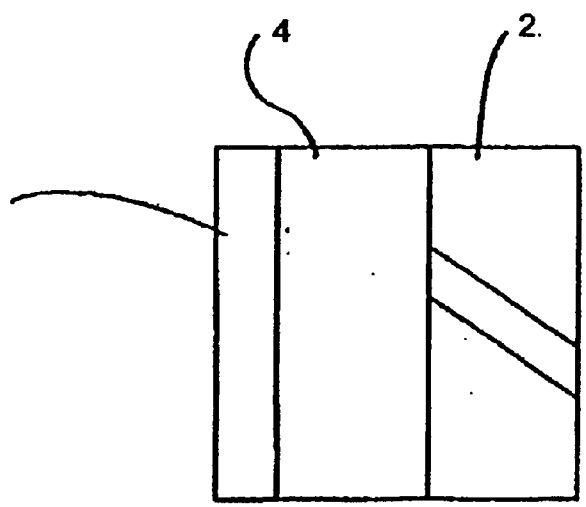
FIG. 2 is a cross-sectional view showing a conventional defogging mirror.
Figure 3:
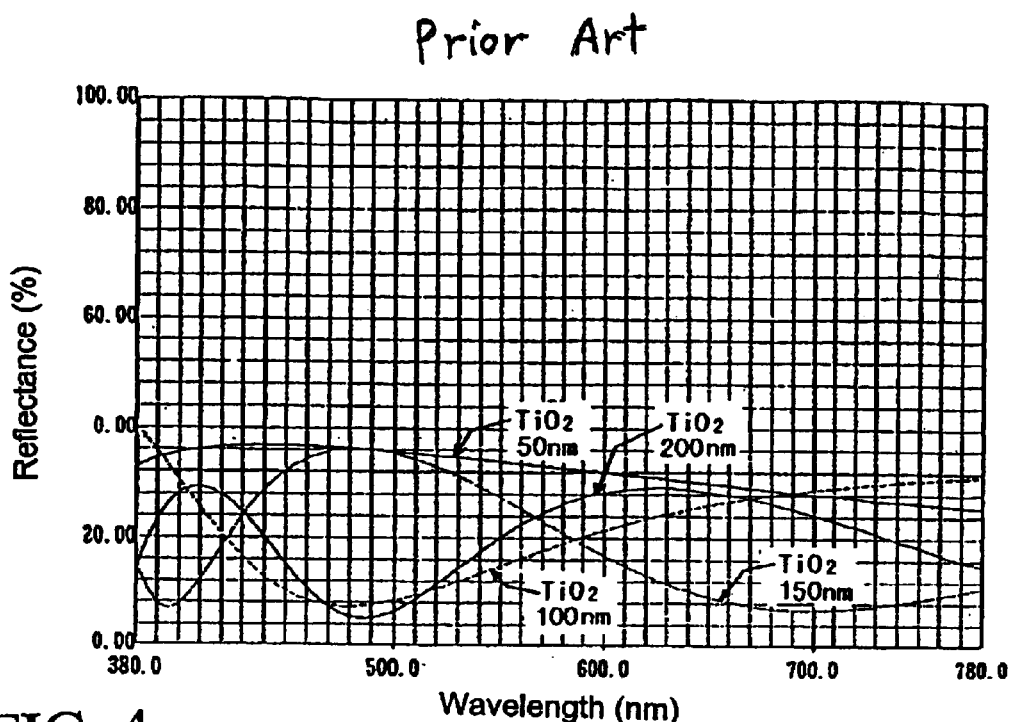
FIG. 3 is a graph indicating reflectance characteristics of a $TiO_2$ film at thicknesses of 50, 100, 150 and 200 nm in a conventional defogging mirror.
Figure 4:
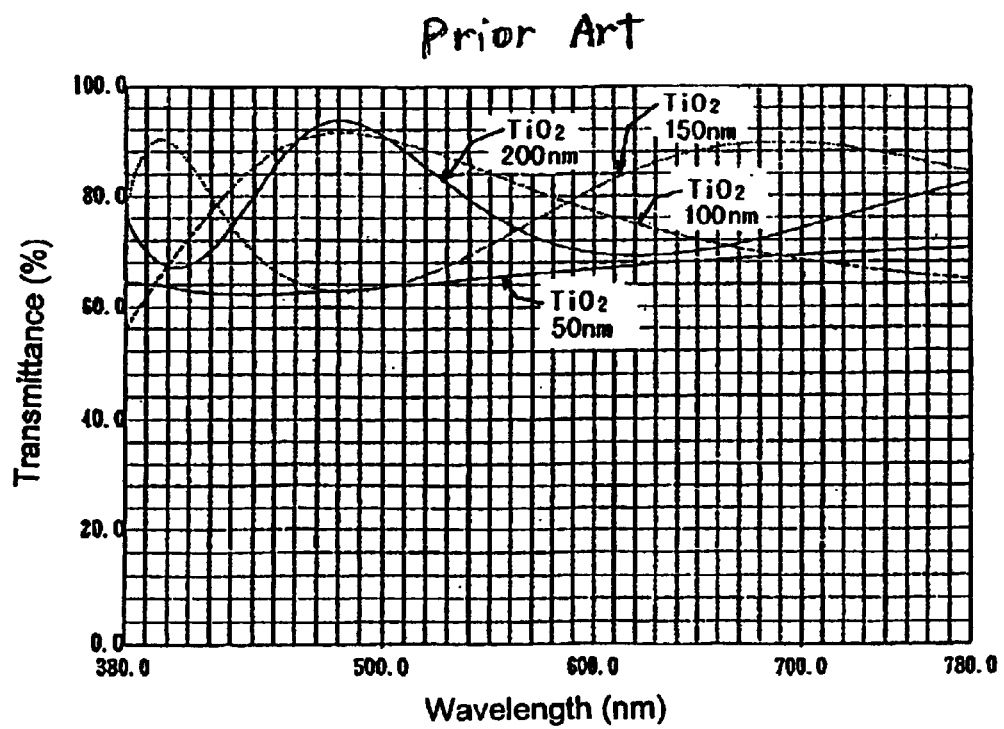
FIG. 4 is a graph indicating transmittance characteristics of a $TiO_2$ film thicknesses of 50, 100, 150 and 200 nm in a conventional defogging mirror.
Figure 5:
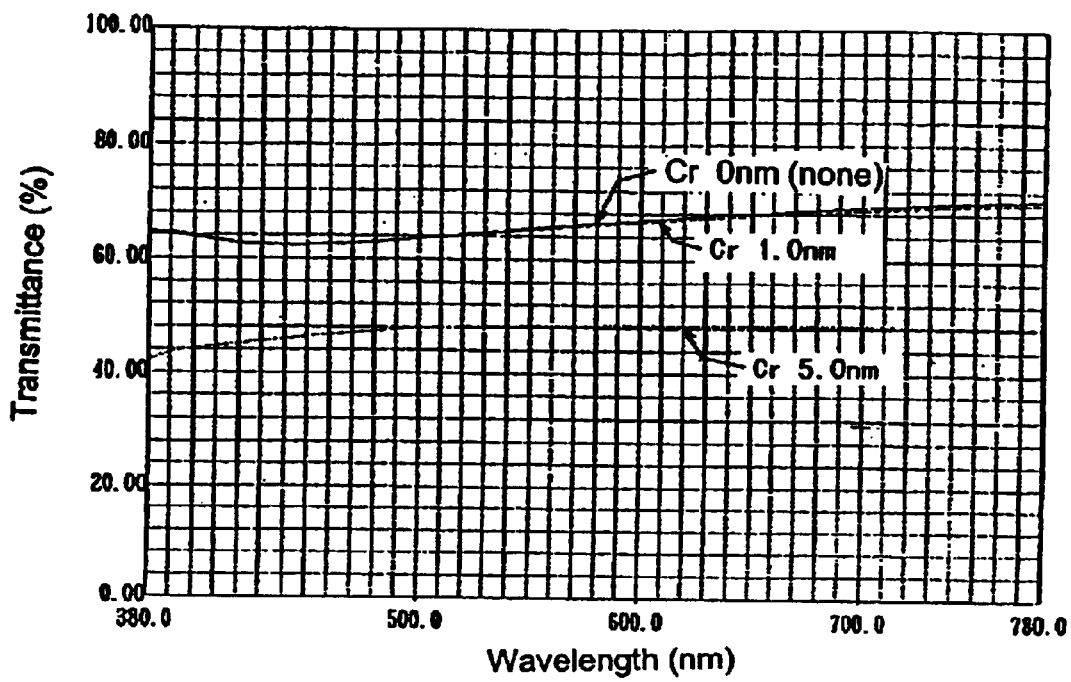
FIG. 5 is a graph indicating transmittance characteristics when Cr is used for a transparent metal thin film of the embodiment shown in FIG. 1.
Figure 6:
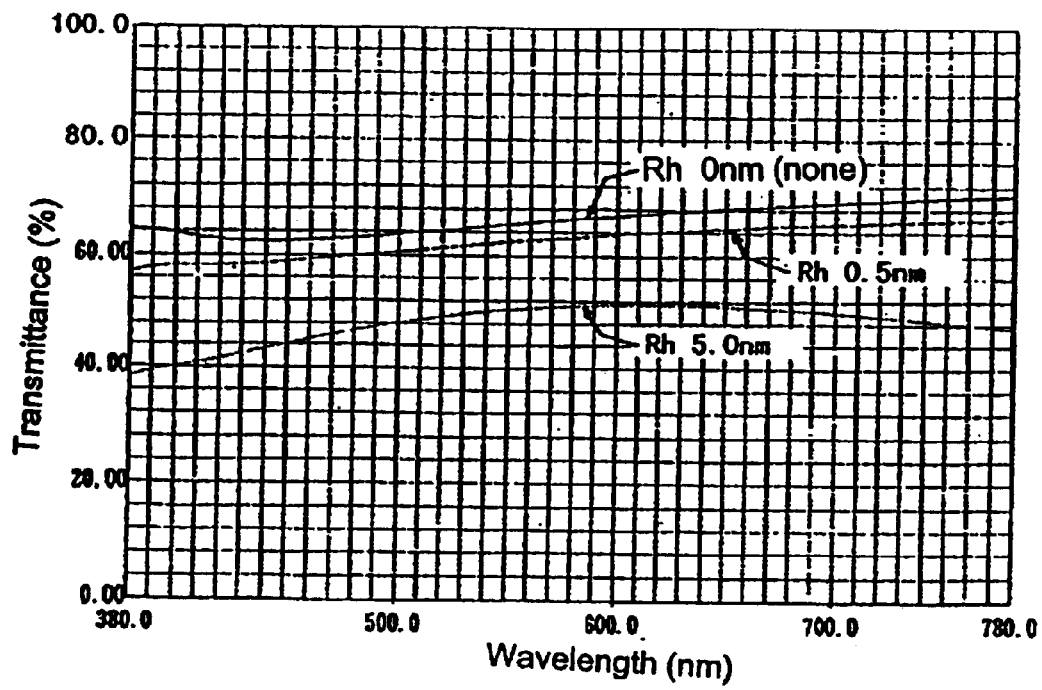
FIG. 6 is a graph indicating transmittance characteristics when Rh is used for a transparent metal thin film of the embodiment shown in FIG. 1.
Figure 7:
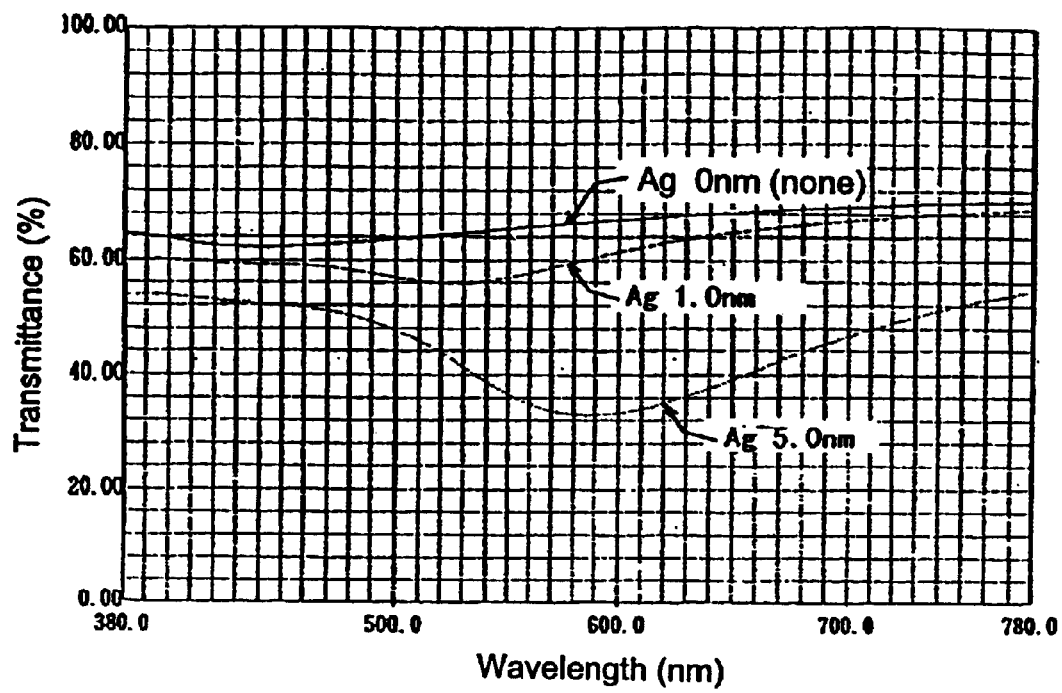
FIG. 7 is a graph indicating transmittance characteristics when Ag is used for a transparent metal thin film of the embodiment shown in FIG. 1.
Figure 8:
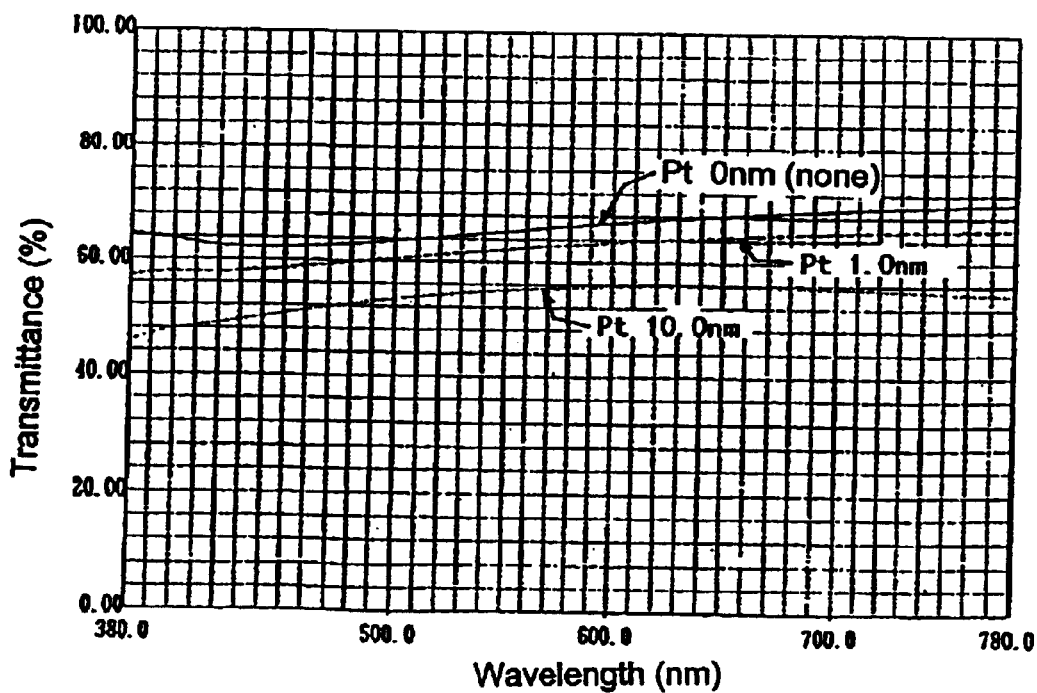
FIG. 8 is a graph of transmittance characteristics when Pt is used for a transparent metal thin film of the embodiment shown in FIG. 1.
Figure 9:
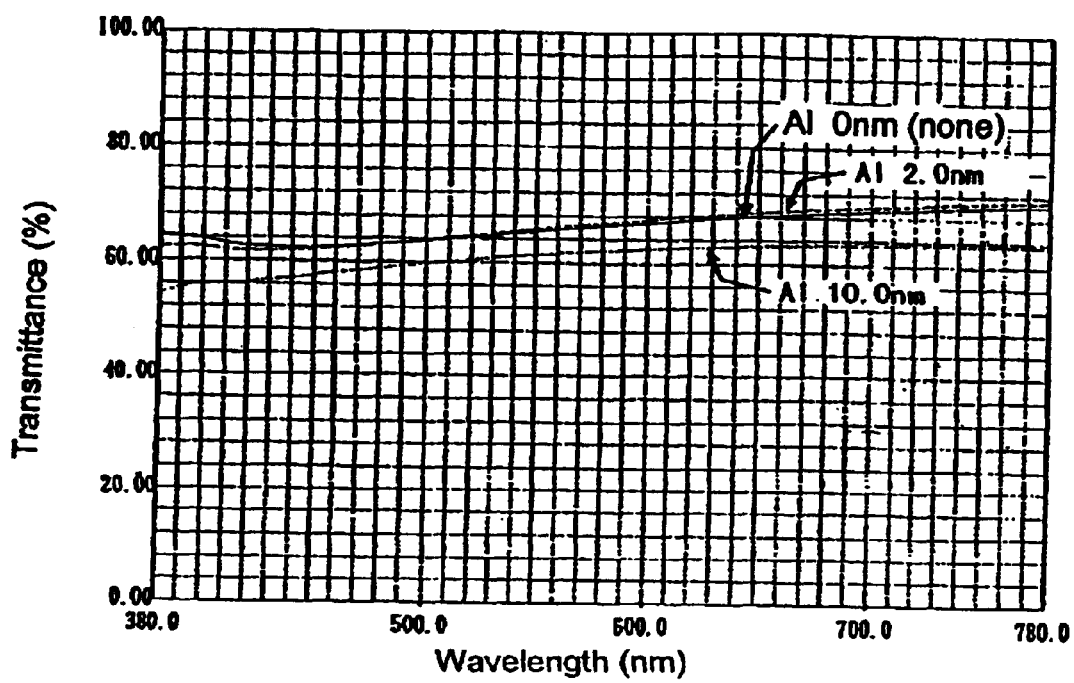
FIG. 9 is a graph of transmittance characteristics when Al is used for a transparent metal thin film of the embodiment shown in FIG. 1.
Figure 14:
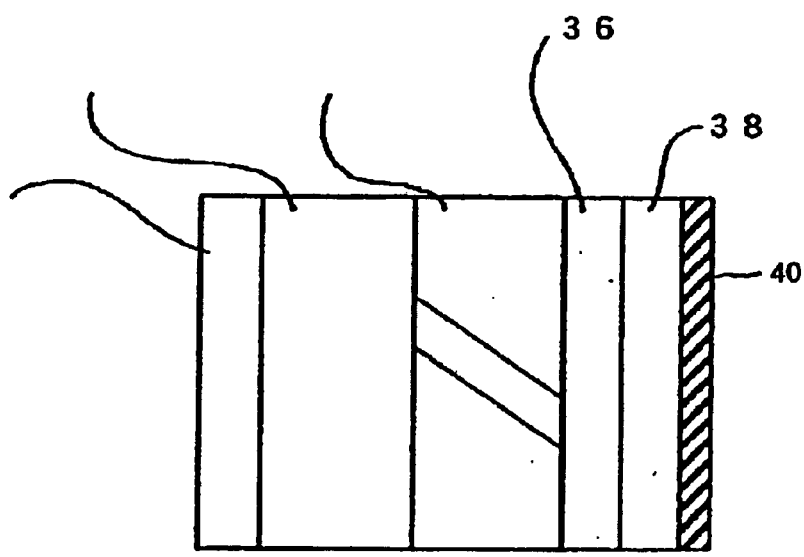
FIG. 14 is a cross-sectional view showing a colored defogging mirror which combines a hydrophilic layer shown in FIG. 2 with the colored mirror shown in FIG. 13.

FIG. 14 shows a structure of a section of a colored defogging mirror which combines the conventional hydrophilic film shown in FIG. 2 with the conventional colored mirror shown in FIG. 13. In this structure, on the surface of a light-transmitting plate material 22 with a conventional colored mirror structure shown in FIG. 13, a $TiO_2$ film 4 and a $SiO_2$ film 6 of a conventional defogging mirror shown in FIG. 2 are combined. Here, a film thickness of the $TiO_2$ film 4 is made at 200 nm and the film thickness of the $SiO_2$ film 6 is made at 10 nm.

Figure 15:
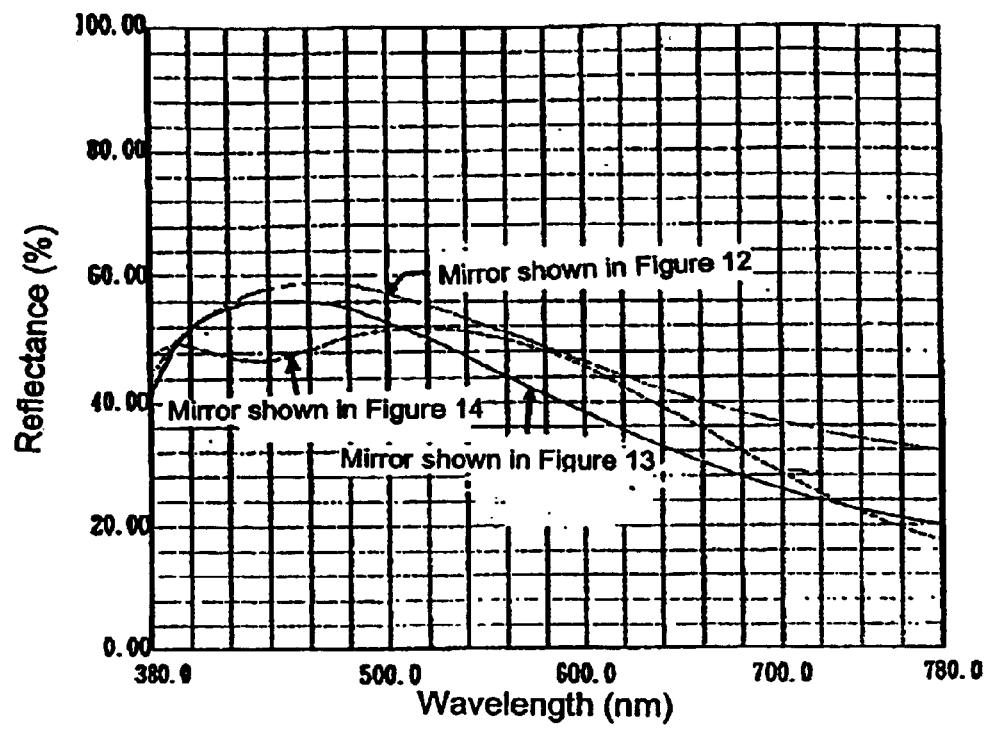
FIG. 15 is a graph of reflectance characteristics of Embodiment 4 of the present invention shown in FIG. 12, the colored mirror shown in FIG. 13 and the colored defogging mirror shown in FIG. 14.

FIG. 15 shows spectral reflectance characteristics in a visible region (380~780 nm) in structures respectively shown in FIGS. 12, 13, and 14. Colored mirrors shown in FIGS. 12 and 13 have the peak reflectance within the limits of 420~480 nm in wavelength, and the surface color is blue. Colored mirrors with a blue color are used for mirrors for automobiles, and possess a property of reducing the glare caused by daytime sunlight. Human visibility peaks at a wavelength of 555 nm when the surroundings are light, and a yellowish green color can be seen clearly. As the surroundings become dark, the peak of human visibility moves toward the blue color group and reaches a peak wavelength of 505 nm. Consequently, since the peak of colored mirrors in the structures shown FIGS. 12 and 13 is shifted from the peak of human visibility during the daytime, they look slightly dark and prevent glare caused by sunlight. At night, since their peak is consistent with the peak of human visibility, reflected images can be seen brightly and they provide excellent visibility.

Since spectral reflectance characteristics of the structure according to the present invention shown in FIG. 12 and of the conventional colored mirror structure shown in FIG. 13 possess a reflectance peak within the limits of 420~480 nm in wavelength, the mirror surface of the structures shown in FIGS. 12 and 13 is blue. As for spectral reflectance characteristics of a conventional hydrophilic film structure shown in FIG. 14, reflectance within the limits of 430~460 nm in wavelength decreased. This is because in order to improve a photocatalytic property, the $TiO_2$ film 4 was four times as thick as that of the structure shown in FIG. 12, resulting in optical interference in the $TiO_2$ film and dissipating the peak. Thus, in the conventional structure shown in FIG. 14, since the surface color of the mirror is not blue, a glare-proof effect is not obtained. In the structure according to the present invention shown in FIG. 12, since the film thickness of a photocatalytic layer containing a photocatalytic substance, which corresponds to a conventional $TiO_2$ film, is made thin enough not to be influenced by optical interference, a color of a specific wavelength cannot be obstructed even if a colored mirror having selective reflection characteristics for specific wavelengths is used.

Embodiment 5

Figure 16:
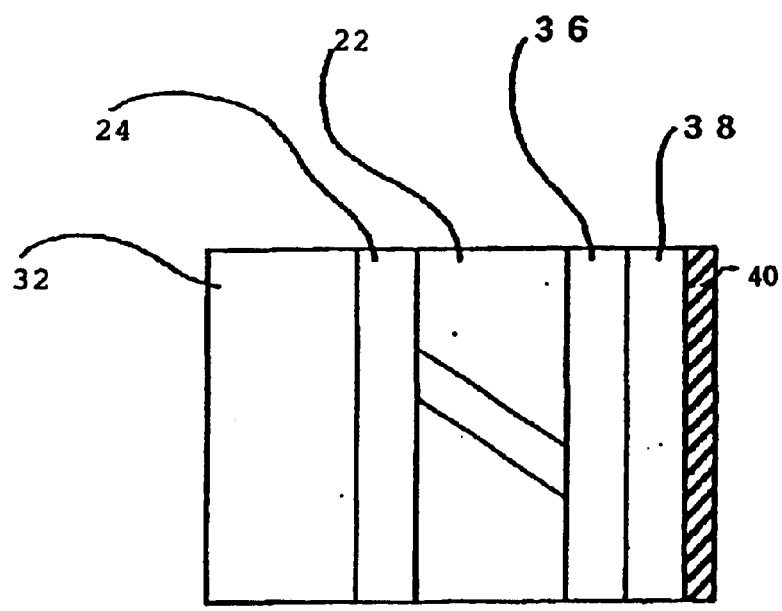
FIG. 16 is a cross-sectional view showing Embodiment 5 of the present invention.

FIG. 16 shows a cross-sectional drawing of Embodiment 5 of a defogging material according to the present invention. On a light-transmitting plate material 22, the same film structure as shown in FIG. 10 is formed. In other words, a transparent metal thin film 24 and a hydrophilic layer 32 comprising a photocatalytic substance are formed. On the back of the light-transmitting plate material 22, similarly to the structure shown in Embodiment 4 (FIG. 12), a $TiO_2$ film 36, a $SiO_2$ film 38 and a reflection film 40 are formed in laminated layers. Alternatively, in this embodiment, the surface of the hydrophilic layer 32 containing a photocatalytic substance can be formed porously.

Embodiment 6

Figure 17:
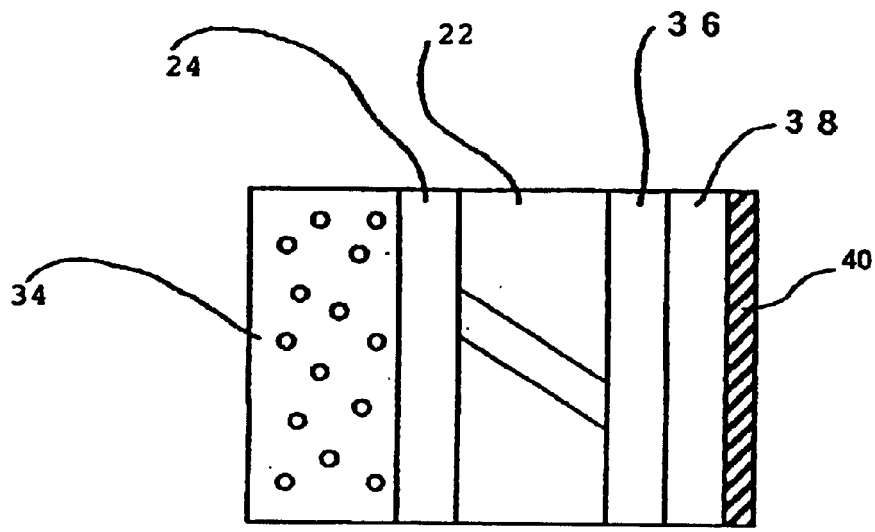
FIG. 17 is a cross-sectional view showing Embodiment 6 of the present invention.

FIG. 17 shows a cross-sectional drawing of Embodiment 6 of a defogging material according to the present invention. On a light-transmitting plate material 22, the same film structure as shown in FIG. 11 is formed. In other words, a transparent metal thin film 24 is formed, and on its surface, a mixed layer 34 containing a photocatalytic substance and a hydrophilic substance is formed. On the back of the light-transmitting plate material 22, similarly to the structure shown in Embodiment 4 (FIG. 12), a $TiO_2$ film 36, a $SiO_2$ film 38 and a reflection film 40 are formed in laminated layers. Alternatively, in this embodiment as well, the surface of the mixed layer of a photocatalytic substance and a hydrophilic substance can be formed porously.

Alternatively, in Embodiments 4 to 6 for carrying out the present invention, eliminating a reflection film 40 and constructed as a light-transmitting colored defogging substrate, the material can be used for lenses, window glass, or the like.

Embodiment 7

Figure 18:
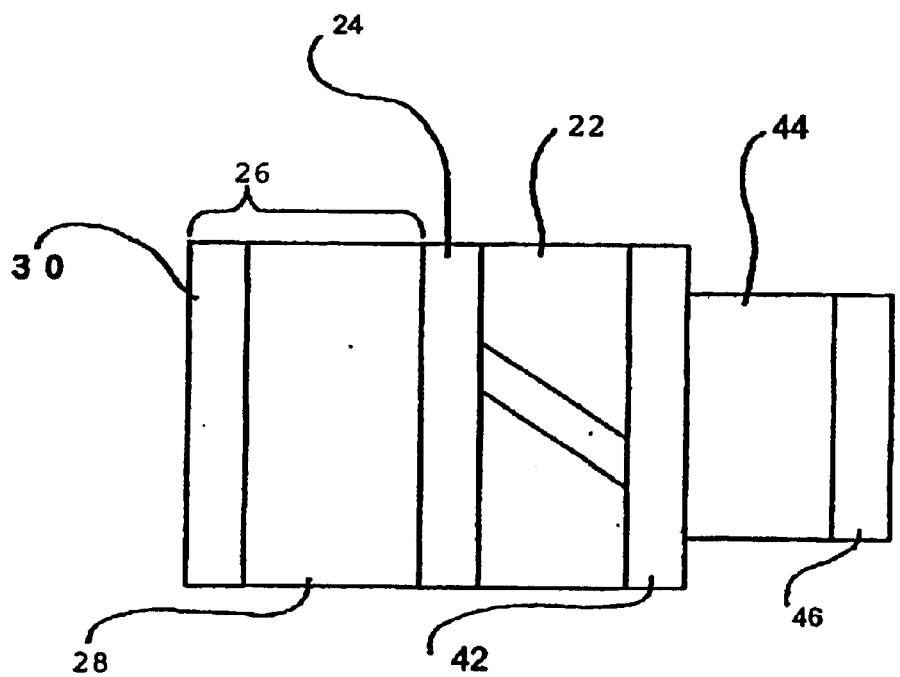
FIG. 18 is a cross-sectional view showing Embodiment 7 of the present invention.

FIG. 18 shows a cross-sectional drawing of Embodiment 7 of a defogging material according to the present invention. On a light-transmitting plate material 22, the same film structure as shown in FIG. 1 is formed. In other words, a transparent metal thin film 24 comprising Cr, Rh, or the like is formed using a vacuum deposition method, sputtering method, or the like and further on the surface of the transparent metal thin film 24, a hydrophilic functional layer 26 containing a photocatalytic substance is formed. The hydrophilic functional layer 26 containing a photocatalytic substance comprises, from the side of the transparent metal thin film 24, a photocatalytic layer 28 containing a photocatalytic substance comprising $TiO_2$ or the like and a hydrophilic layer 30 containing a hydrophilic substance comprising $SiO_2$ or the like, which are formed in laminated layers using a vacuum deposition method, sputtering method, or the like. Alternatively, in this embodiment for carrying out the invention, to improve hydrophilicity further, the surface of a hydrophilic layer 30 containing a photocatalytic substance can be formed porously. On the back of a light-transmitting plate material 22, a transparent electrode film 42 comprising ITO, $SnO_2$, etc, and on its back, a solid-phase electrochromic layer 44 comprising three layers of an oxidation coloring layer such as IrOx, NiOx, or the like, an electrolyte such as $Ta_2O_6$ or the like and a reduction coloring layer such as $WO_3$, $MoO_3$, or the like is formed using a vacuum deposition method, sputtering method, or the like. Further, on the back of the solid-phase electrochromic layer 44, an electrode and reflective film 46 comprising Cr, Al, or the like is formed using a vacuum deposition method, sputtering method, or the like. The transparent electrode film 42 and the electrode and reflective film 46 are conducted to electrodes (not shown) respectively. By applying electricity to these, an oxidation-reduction reaction takes place at the solid-phase electrochromic layer 44 and this defogging mirror changes to a glare-proof (colored) state. Alternatively, to prevent corrosion of the electrode and reflective film 46, a sealed resin or a sealed substrate (not shown) can be provided on a surface contacting the exterior of the electrode and reflective film 46.

Figure 19:
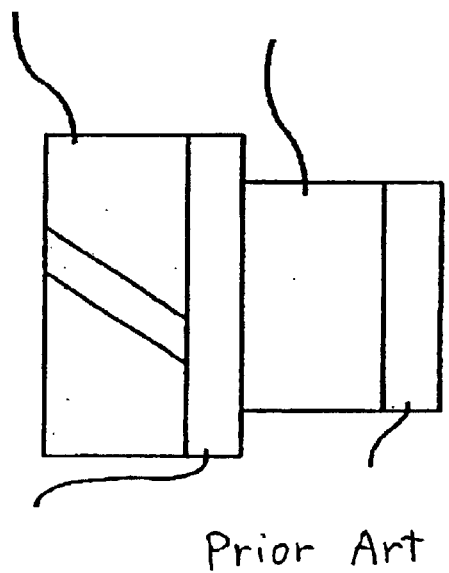
FIG. 19 is a cross-sectional view showing a conventional solid-phase electrochromic glare-proof mirror.

Next, spectral reflectance of a mirror shown in FIG. 18 and conventional mirrors are described. Here, it is presumed that a mirror shown in FIG. 18 is formed and comprises photocatalytic layer 28 containing a photocatalytic substance comprising $TiO_2$ with a film thickness of 50 nm, and a hydrophilic layer 30 containing a hydrophilic substance comprising $SiO_2$ with a film thickness of 10 nm. FIG. 19 shows a structure of a section of a conventional solid-phase electrochromic glare-proof mirror. On the back of the light-transmitting plate material 22, similarly to the structure shown in FIG. 18, a transparent electrode film 42, and furthermore on its back, a solid-phase electrochromic layer 44 comprising three layers of an oxidation coloring layer, an electrolyte and a reduction coloring layer and an electrode-reflection dual function film 46 are provided. Additionally, an electrode structure and a glare-proof (coloring) action are the same as those in the structure shown in FIG. 18.

Figure 20:
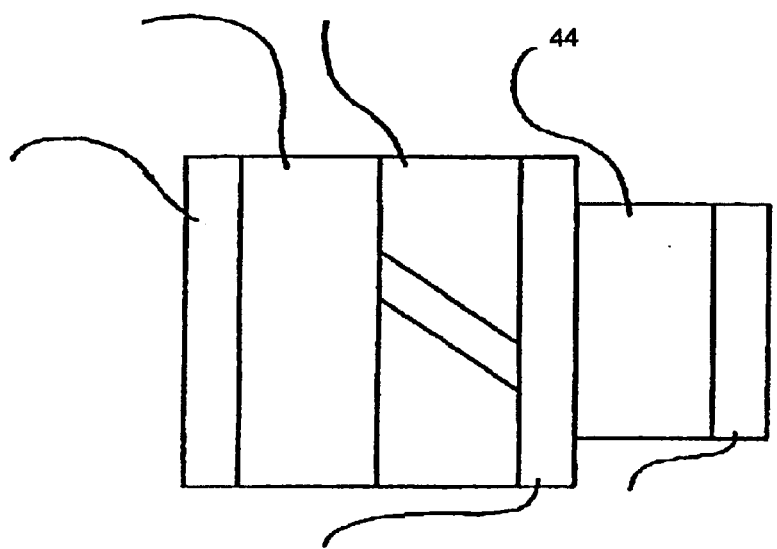
FIG. 20 is a cross-sectional view showing a solid-phase electrochromic glare-proof defogging mirror which combines a hydrophilic film shown in FIG. 2 with the solid-phase electrochromic glare-proof mirror shown in FIG. 19.

FIG. 20 shows a structure of a solid-phase electrochromic glare-proof defogging mirror with a $TiO_2$ film 4 and a $SiO_2$ film 6 of a conventional defogging mirror shown in FIG. 2 being laminated on a conventional solid-phase electrochromic glare-proof mirror shown in FIG. 19. On the surface of a light-transmitting plate material 22, a photocatalytic substance film 4 is provided, and furthermore on its surface, a $SiO_2$ film 6 is provided. On the back of the light-transmitting plate material 22, similarly to the structure shown in FIG. 18, a transparent electrode film 42 is provided, and furthermore on its back, a solid-phase electrochromic layer 44 comprising three layers of an oxidation coloring layer, an electrolyte and a reduction coloring layer and an electrode is provided, and furthermore on its back an electrode-reflection dual function film 46 are provided. Additionally, an electrode structure and a glare-proof (coloring) action are the same as those in the structure shown in FIG. 18. Here, the mirror shown in FIG. 18 is considered to be formed with a $TiO_2$ film at a thickness of 200 nm and a $SiO_2$ film at a thickness of 10 nm.

Figure 21:
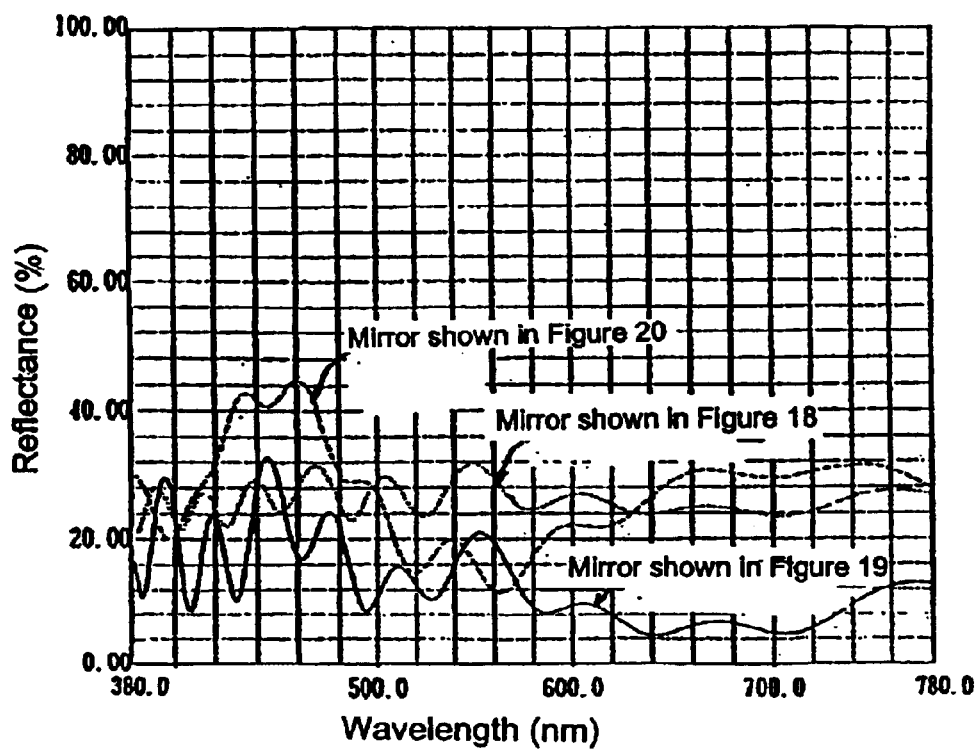
FIG. 21 is a graph of reflectance characteristics of Embodiment 7 of the present invention shown in FIG. 18, the solid-phase electrochromic glare-proof mirror shown in FIG. 19 and the solid-phase electrochromic glare-proof defogging mirror shown in FIG. 20.

FIG. 21 shows spectral reflectance characteristics in a visible region (380~780 nm) when structures shown in FIGS. 18, 19 and 20 respectively change to a colored state. Spectral reflectance characteristics of the structure shown in FIG. 18 in the embodiment according to the present invention and of the conventional electrochromic mirror without a hydrophilic film with the structure shown in FIG. 19 do not show peaks with distinguishable reflectance in a visible region. Meanwhile, in the case of the structure shown in FIG. 20 with a conventional hydrophilic film, a peak with high reflectance appears within the limits of wavelength from 430 nm to 470 nm. This is because a thicker $TiO_2$ film is provided to improve a photocatalytic property and an optical interference action takes place. Thus, with the structure having a conventional hydrophilic film shown in FIG. 20, because a peak with high reflectance appears within the wavelength limits of a visible region, a glare-proof effect being displayed by an electrochromic layer is obstructed. In the case of a mirror with such reflectance characteristics as that of the structure shown in FIG. 19, because a color tone by a peak wavelength appears on a reflection image and obstructs coloring caused by an electrochromic element, it is not suitable to be used for an electrochromic defogging mirror. However, the structure shown in FIG. 18 according to the present invention does not have a peak with high reflectance in the reflectance characteristics and it is suitable to be used for an electrochromic glare-proof mirror with a defogging function.

Alternatively, the structure shown in FIG. 18, in place of an electrode-reflection dual function film 46, by forming a transparent electrode film such as ITO or the like, can be used for a solid-phase electrochromic glare-proof defogging light-transmitting substrate.

Embodiment 8

Figure 22:
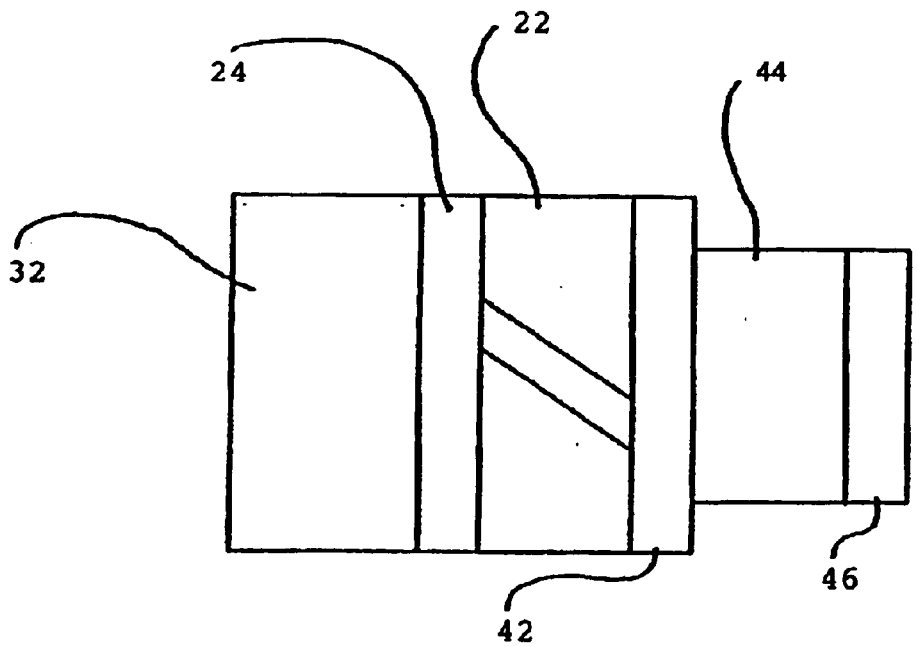
FIG. 22 is a cross-sectional view showing Embodiment 8 of the present invention.

FIG. 22 shows a cross-sectional drawing of Embodiment 8 of a defogging material according to the present invention. On a light-transmitting plate material 22, the same film structure as shown in FIG. 10 is formed. In other words, a transparent metal thin film 24 and further, a hydrophilic layer 32 comprising a photocatalytic substance are formed. Alternatively, in this embodiment for carrying out the invention, to improve hydrophilicity further, the surface of a hydrophilic layer 32 containing a photocatalytic substance can be formed porously. On the back of the light-transmitting plate material 22, a transparent electrode film 42 is provided, and further, on its back, a solid-phase electrochromic layer 44 comprising three layers of an oxidation coloring layer, an electrolyte and a reduction coloring layer are provided, and furthermore on its back, an electrode-reflection dual function film 46 are provided. Additionally, an electrode structure and a glare-proof (coloring) action are the same as those of Embodiment 7 for carrying out the present invention shown in FIG. 18.

Embodiment 9

Figure 23:
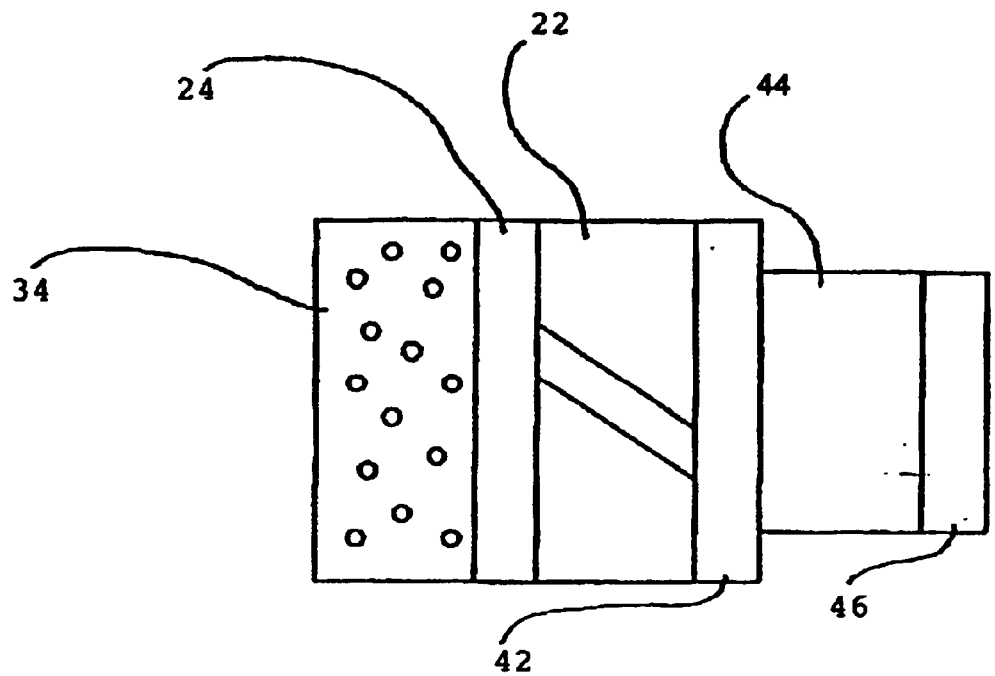
FIG. 23 is a cross-sectional view showing Embodiment 9 of the present invention.

FIG. 23 shows a cross-sectional drawing of Embodiment 9 for carrying out a defogging material according to the present invention. On a light-transmitting plate material 22, the same film structure as shown in FIG. 11 is formed. In other words, a transparent metal thin film 24 comprising Cr, Rh, or the like is formed, and on the surface of the transparent metal thin film 24, a mixed layer 34 containing a photocatalytic substance comprising $TiO_2$ or the like and a hydrophilic substance comprising $SiO_2$ or the like is formed. Alternatively, in this embodiment for carrying out the invention as well, the mixed layer 34 containing a photocatalytic substance and a hydrophilic substance can be formed porously. On the back of the light-transmitting plate material 22, a transparent electrode film 42 is provided, and further, on the back, a solid-phase electrochromic layer 44 comprising three layers of an oxidation coloring layer, an electrolyte and a reduction coloring layer are provided, and further, on the back, an electrode-reflection dual function film 46 is provided. An electrode structure and a glare-proof (coloring) action are the same as those of Embodiment 7 for carrying out the present invention shown in FIG. 18.

Embodiment 10

Figure 24:
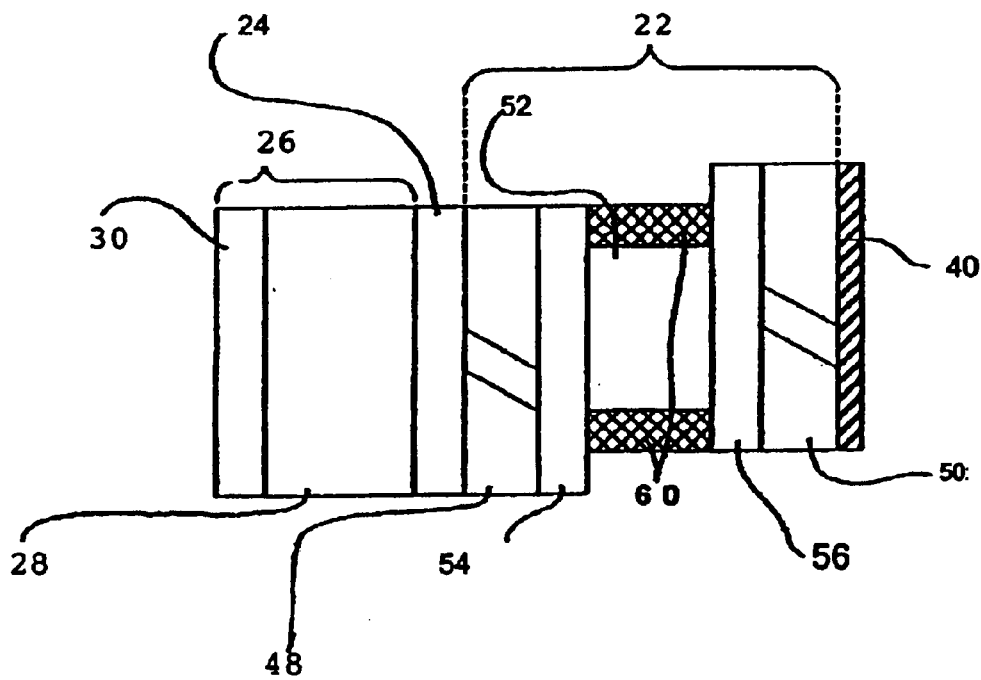
FIG. 24 is a cross-sectional view showing Embodiment 10 of the present invention.

FIG. 24 shows a cross-sectional drawing of Embodiment 10 of a defogging material according to the present invention. A light-transmitting plate material 22 comprises a structure wherein a liquid-phase electrochromic layer 52 composed of (a) an electrolyte solution comprising (i) an electrochromic substance selected from $WO_3$, $MoO_3$, IrOx, NiOx, or the like, (ii) an electrolyte such as LiI, $LiClO_4$, or the like, and (iii) solvent such as r-butyrolactone, propylenecarbonate or the like and/or an ultraviolet absorbent such as benzophenone and cyanoacrylate or the like, or (b) an electrochromic solution comprising (I) an electrochromic substance such as viologen or the like and (II) a solvent such as r-butyrolactone, propylenecarbonate, or the like and/or an ultraviolet absorbent such as benzophenone and cyanoacrylate, or the like is interposed between the first light-transmitting substrate 48 and the second light-transmitting substrate 50. Further, on the surfaces opposite to the first light-transmitting substrate 48 and the second light-transmitting substrate 50, the first and second transparent electrode films 54 and 56 comprising ITO, $SnO_2$, or the like are provided, respectively. Additionally, the surroundings of the liquid-phase electrochromic layer 52 are sealed by a sealing material 60 composed of an adhesive or the like to prevent the solution from leaking. On the surface of the light-transmitting plate material 22, the same film structure as that shown in FIG. 1 is formed. In other words, a transparent metal thin film 24 is formed, and furthermore on its surface, a hydrophilic functional layer 26 containing a photocatalytic substance is provided. The hydrophilic functional layer 26 containing a photocatalytic substance comprises, from the side of the hydrophilic functional layer 26, a photocatalytic layer 28 containing a photocatalytic substance comprising $TiO_2$ or the like and a hydrophilic layer 30 containing a hydrophilic substance comprising $SiO_2$ or the like, which are formed in laminated layers. Alternatively, in this embodiment for carrying out the invention, to improve hydrophilicity further, the surface of a hydrophilic layer 30 containing a hydrophilic substance can be formed porously. On the back of the light-transmitting plate material 22, a reflection film 24 comprising Cr, Al, or the like is formed using a vacuum deposition method, sputtering method, or the like The first transparent electrode film 54 and the second transparent electrode film 56 are electrically connected to electrodes (not shown), respectively. By applying electricity to these, an oxidation-reduction reaction takes place at the liquid-phase electrochromic layer 44 and this defogging mirror of Embodiment 10 for carrying out the present invention changes to a glare-proof (colored) state.

Alternatively, in place of a hydrophilic functional layer 26 containing a photocatalytic substance, similarly to Embodiment 8 for carrying out the present invention (FIG. 22), the same effect can be obtained by constructing a hydrophilic layer 32 comprising a hydrophilic substance.

Alternatively, in place of a hydrophilic functional layer 26 containing a photocatalytic substance, similarly to Embodiment 9 for carrying out the present invention (FIG. 23), the same effect can be obtained by constructing a hydrophilic layer 32 comprising a photocatalytic substance.

Additionally, not providing a reflection film 40 and constructing as a light-transmitting liquid-phase electrochromic defogging material, this material can be used as a light controlling window or the like.

Alternatively, without using a reflection film 40, by replacing the second transparent electrode film 56 with an electrode-reflection dual function film, a liquid-phase electrochromic glare-proof defogging mirror can be obtained.

Alternatively, to prevent corrosion of the first and the second transparent electrode films 54 and 56 by a solvent used for the liquid-phase electrochromic layer 52, an electrode protective layer comprising light-transmitting SiO$_2$ or the like can be provided between the first and the second transparent electrode films 54 and 56 and the liquid-phase electrochromic layer 52.

INDUSTRIAL APPLICABILITY

As described above, a composite material according to the present invention can be used, by applying to a mirror, for automobile outer mirrors as a defogging mirror, as a colored defogging mirror wherein a reflection surface is colored, or as an electrochromic glare-proof mirror. Further, the composite material can be used for a lens, a window, and the like, by constructing a light-transmitting colored defogging plate without providing a reflection film, or the composite material can be used for a light-adjusted window by constructing a light-transmitting liquid-phase electrochromic defogging material.

What is claimed is:

1. A composite material comprising a base material, a transparent metal thin film formed on a surface of the base material, and a hydrophilic functional layer containing a photocatalytic substance formed on a surface of the transparent metal thin film.

2. The composite material according to claim 1, wherein said base material comprises a light-transmitting material.

3. The composite material according to claim 1, wherein said base material comprises a plate material.

4. The composite material according to claim 3, wherein said base material comprises a light-transmitting plate material.

5. The composite material according to claim 4, wherein a reflection film is formed on the back of said light-transmitting plate material to configure said light-transmitting plate material as a defogging mirror.

6. The composite material according to claim 4, wherein said light-transmitting plate material comprises a light-transmitting colored plate material which has light wavelength selectivity.

7. The composite material according to claim 6, wherein a reflection film is formed on the back of said light-transmitting plate material to configure said light-transmitting plate material as a defogging mirror.

8. The composite material according to claim 4, wherein said light-transmitting plate material comprises two light-transmitting substrates, a liquid-phase electrochromic layer interposed therebetween, and transparent electrode films provided on the respective opposite surfaces of said two light-transmitting substrates.

9. The composite material according to claim 8, wherein a reflection film is formed on the back of said light-transmitting plate material to configure said light-transmitting plate material as a defogging mirror.

10. The composite material according to claim 4, wherein a first transparent electrode film, a solid-phase electrochromic layer, and a second transparent electrode film are formed in sequence in laminated layers on the back of the light-transmitting substrate to configure said light-transmitting plate material as a defogging mirror.

11. The composite material according to claim 3, wherein a transparent electrode film, a solid-phase electrochromic layer, and an electrode-reflection dual function film are formed in sequence in laminated layers on the back of the light-transmitting substrate to configure said plate material as a defogging mirror.

12. The composite material according to claim 3, wherein said plate material comprises: a light-transmitting substrate with a transparent electrode film formed on one side of the light-transmitting substrate; a substrate with an electrode-reflection dual function film formed on one side of the substrate; and a liquid-phase electrochromic layer interposed between said light-transmitting substrate and said substrate, wherein said transparent electrode film and said electrode-reflection dual function film face each other, to configure said plate material as a defogging mirror.

13. The composite material according to claim 5, which is configured as an outer mirror for automobile use.

14. The composite material according to claim 7, which is configured as an outer mirror for automobile use.

15. The composite material according to claim 9, which is configured as an outer mirror for automobile use.

16. The composite material according to claim 11, which is configured as an outer mirror for automobile use.

17. The composite material according to claim 12, which is configured as an outer mirror for automobile use.

18. The composite material according to claim 1, wherein said hydrophilic functional layer containing said photocatalytic substance comprises as a main element a laminate of, from the side of said base material, a photocatalyst layer containing a photocatalytic substance and a hydrophilic layer containing a hydrophilic substance.

19. The composite material according to claim 18, wherein said hydrophilic layer containing said hydrophilic substance has a layer thickness of 50 nm or less.

20. The composite material according to claim 1, wherein said hydrophilic functional layer containing said photocatalytic substance comprises as its main element a mixed layer containing a photocatalytic substance and a photocatalytic substance.

21. The composite material according to claim 14, wherein the main component of said photocatalytic substance is TiO$_2$ and the main component of said hydrophilic substance is SiO$_2$.

22. The composite material according to claim 15, wherein the main component of said photocatalytic substance is TiO$_2$ and the main component of said hydrophilic substance is SiO$_2$.

23. The composite material according to claim 16, wherein the main component of said photocatalytic substance is TiO$_2$ and the main component of said hydrophilic substance is SiO$_2$.

24. The composite material according to claim 1, wherein said hydrophilic functional layer containing said photocatalytic substance comprises as a main element a layer which comprises a photocatalytic substance.

25. The composite material according to claim 24, wherein the main component of said photocatalytic substance is TiO$_2$.

26. The composite material according to claim 1, wherein the surface of the hydrophilic functional layer containing said photocatalytic substance is porous.

27. The composite material according to claim 1, wherein said transparent metal thin film comprises as a main component Cr, Rh, Ag, Pt, Al or a mixture of the foregoing.

28. The composite material according to claim 1, wherein said transparent metal thin film has a film thickness of 1.0 to 10 nm.

29. The composite material according to claim 1, wherein said transparent metal thin film is a film formed using a vacuum deposition method or sputtering method.

30. The composite material according to claim 1, wherein said transparent metal thin film is made of at least one selected from the group consisting of Cr, Rh, Ag, Pt and Al using a vacuum deposition method or sputtering method.

31. The composite material according to claim 1, wherein said transparent metal thin film is configured to improve photocatalytic performance of the photocatalytic substance.

* * * * *